United States Patent
Schrum et al.

(10) Patent No.: US 9,059,932 B2
(45) Date of Patent: Jun. 16, 2015

(54) PACKET ORDERING BASED ON DELIVERY ROUTE CHANGES IN COMMUNICATION NETWORKS

(75) Inventors: Sidney B. Schrum, Ocala, FL (US); Richard E. Newman, Gainsville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 13/288,313

(22) Filed: Nov. 3, 2011

(65) Prior Publication Data

US 2013/0114598 A1    May 9, 2013

(51) Int. Cl.
*H04L 12/28* (2006.01)
*H04L 12/707* (2013.01)

(52) U.S. Cl.
CPC ............... *H04L 45/22* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 5,430,710 A | 7/1995 | Mueller et al. | |
| 5,946,309 A | 8/1999 | Westberg et al. | |
| 6,130,896 A | 10/2000 | Lueker et al. | |
| 6,243,360 B1 | 6/2001 | Basilico | |
| 6,245,684 B1 | 6/2001 | Zhao et al. | |
| 6,272,551 B1 | 8/2001 | Martin et al. | |
| 6,947,379 B1 | 9/2005 | Gleichauf et al. | |
| 6,947,736 B2 | 9/2005 | Shaver et al. | |
| 6,970,419 B1 | 11/2005 | Kalkunte et al. | |
| 6,970,420 B1 | 11/2005 | Kalkunte et al. | |
| 6,973,031 B1 | 12/2005 | Kalkunte et al. | |
| 7,113,763 B2 | 9/2006 | Heinonen et al. | |
| 7,159,034 B1 | 1/2007 | Rai | |
| 7,262,695 B2 | 8/2007 | Hicks | |
| 7,269,403 B1 | 9/2007 | Miao | |
| 7,349,325 B2 | 3/2008 | Trzeciak et al. | |
| 7,391,317 B2 | 6/2008 | Abraham et al. | |

(Continued)

FOREIGN PATENT DOCUMENTS

| | | |
|---|---|---|
| CN | 103918233 | 7/2014 |
| CN | 103918307 | 7/2014 |

(Continued)

OTHER PUBLICATIONS

International Search Report and Written Opinion—PCT/US2012/063425—ISA/EPO—Feb. 18, 2013.

(Continued)

*Primary Examiner* — Duc C Ho
(74) *Attorney, Agent, or Firm* — DeLizio Law, PLLC

(57) ABSTRACT

A hybrid network device can implement functionality to detect a change in a packet route associated with one or more packets sharing a common route, and to manage out-of-order packet arrival. In a hybrid communication network, a first network device can communicate with a second network device via a plurality of packet routes. The first network device can detect one or more route change indicators that are indicative of a change in a packet route between the first network device and the second network device from a first packet route to a second packet route based, at least in part, on a plurality of packets received from the second network device. Based on the route change indicators, it may be determined whether the plurality of packets were received according to a predetermined order and if the plurality of packets should be re-ordered based on the predetermined order.

18 Claims, 6 Drawing Sheets

(56) References Cited

U.S. PATENT DOCUMENTS

| | | |
|---|---|---|
| 7,415,028 B1 | 8/2008 | Allam |
| 7,440,443 B2 | 10/2008 | Logvinov et al. |
| 7,492,772 B2 | 2/2009 | Nam et al. |
| 7,583,952 B2 | 9/2009 | Lee et al. |
| 7,599,323 B2 | 10/2009 | Chandranmenon et al. |
| 7,725,096 B2 | 5/2010 | Riveiro et al. |
| 7,751,414 B2 | 7/2010 | Lee et al. |
| 7,769,002 B2 | 8/2010 | Gong et al. |
| 7,835,743 B2 | 11/2010 | Zhang et al. |
| 7,899,057 B2 * | 3/2011 | Noble .................... 370/394 |
| 8,437,267 B2 | 5/2013 | Amir et al. |
| 8,824,477 B2 | 9/2014 | Schrum, Jr. et al. |
| 2002/0150039 A1 | 10/2002 | Valdevit |
| 2005/0180327 A1 * | 8/2005 | Banerjee et al. ............ 370/236 |
| 2006/0187955 A1 | 8/2006 | Rezaiifar et al. |
| 2007/0076666 A1 | 4/2007 | Riveiro et al. |
| 2007/0130598 A1 | 6/2007 | Choi et al. |
| 2007/0195799 A1 * | 8/2007 | Kanazawa et al. ........... 370/401 |
| 2007/0229231 A1 | 10/2007 | Hurwitz et al. |
| 2008/0080380 A1 | 4/2008 | Lee et al. |
| 2008/0130640 A1 | 6/2008 | Hurwitz et al. |
| 2008/0144491 A1 | 6/2008 | Yoshida et al. |
| 2008/0159288 A1 * | 7/2008 | Nagarajan et al. ........... 370/392 |
| 2008/0205406 A1 * | 8/2008 | Hatakeyama ................ 370/394 |
| 2009/0046577 A1 * | 2/2009 | Marin ...................... 370/219 |
| 2009/0156159 A1 | 6/2009 | Lim et al. |
| 2009/0252209 A1 | 10/2009 | Riveiro et al. |
| 2009/0323829 A1 | 12/2009 | Riveiro et al. |
| 2010/0040007 A1 | 2/2010 | Itagaki et al. |
| 2013/0114606 A1 | 5/2013 | Schrum, Jr. et al. |
| 2013/0128738 A1 * | 5/2013 | Cohen et al. ................ 370/235 |
| 2013/0132604 A1 | 5/2013 | Cohen et al. |

FOREIGN PATENT DOCUMENTS

| | | |
|---|---|---|
| EP | 0462540 A2 | 12/1991 |
| EP | 0895379 A1 | 2/1999 |
| EP | 1337075 | 8/2003 |
| JP | 3510634 | 3/2004 |
| JP | 2004080139 | 3/2004 |
| JP | 2008153893 | 7/2009 |
| JP | 2009239444 | 10/2009 |
| JP | 2009147579 | 12/2014 |
| JP | 2014540156 | 12/2014 |
| KR | 1020140073561 | 6/2014 |
| KR | 101492510 | 2/2015 |
| WO | 0027087 | 5/2000 |
| WO | 0027087 A1 | 5/2000 |
| WO | 2006089204 A2 | 8/2006 |
| WO | 2011070479 | 6/2011 |
| WO | 2013067377 | 5/2013 |
| WO | 2013067433 | 5/2013 |

OTHER PUBLICATIONS

"PCT Application No. PCT/US2012/063359 International Search Report", May 6, 2013, 17 pages.

"International Application No. PCT/US2012/063359 Partial International Search Report—ISA/EPO", Feb. 18, 2013, 7 pages.

Co-pending U.S. Appl. No. 13/288,319, filed Nov. 3, 2011, 48 pages.

PCT Application No. PCT/US2012/063425, Written Opinion of the IPEA, 5 pages, Oct. 17, 2013.

U.S. Appl. No. 13/288,319 Office Action, 12 Pages, Oct. 24, 2013.

"PCT Application No. PCT/US2012/063425 International Preliminary Report on Patentability", Jan. 21, 2014, 6 pages.

"1905.1-2013—IEEE Standard for a Convergent Digital Home Network for Heterogeneous Technologies", http://standards.ieee.org/findstds/standard/1905.1-2013.html (obtained from internet Feb. 10, 2014, 1 page.

"802.1Q-2011—IEEE Standard for Local and metropolitan area networks—Media Access Control (MAC) Bridges and Virtual Bridged Local Area Networks", http://standards.ieee.org/findstds/standard/802.1Q-2011.html (date obtained from the internet Feb. 10, 2014), 1 page.

"International Application No. PCT/US2012/063359 Written Opinion of the IPEA", Apr. 10, 2014, 7 pages.

"PCT Application No. PCT/US2012/063359 International Preliminary Report on Patentability", Jun. 19, 2014, 12 pages.

"Japanese Patent Application No. 2014-540142, Office Action, Feb. 9, 2015, 9 pages".

* cited by examiner

US 9,059,932 B2

PACKET ORDERING BASED ON DELIVERY ROUTE CHANGES IN COMMUNICATION NETWORKS

BACKGROUND

Embodiments of the inventive subject matter generally relate to the field of communication systems and, more particularly, to packet ordering based on delivery route changes in hybrid communication networks.

Hybrid communication networks typically comprise multiple networking technologies (e.g., wireless local area network (WLAN) technologies, powerline communication technologies, Ethernet, etc.) that are interconnected using bridging-capable devices that forward packets between the different network technologies and media in order to form a single extended communication network. Typically, the communication mechanisms, and protocol specifics (e.g., device and topology discovery, bridging to other networks, etc.) are unique to each networking technology. The hybrid communication network can provide different routes associated with one or more of the different network technologies to deliver packets from a source network device to a destination network device

SUMMARY

Various embodiments for packet ordering based on delivery route changes in hybrid communication networks are disclosed. In one embodiment, a first network device detects one or more route change indicators that are indicative of a change in a packet route between the first network device and a second network device of a communication network from a first packet route of a plurality of packet routes to a second packet route of the plurality of packet routes based, at least in part, on a plurality of packets received from the second network device. It is determined whether the plurality of packets were received in accordance with a predetermined packet order based on the one or more route change indicators. The plurality of packets are re-ordered in accordance with the predetermined packet order in response to determining that the plurality of packets were not received in accordance with the predetermined packet order.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
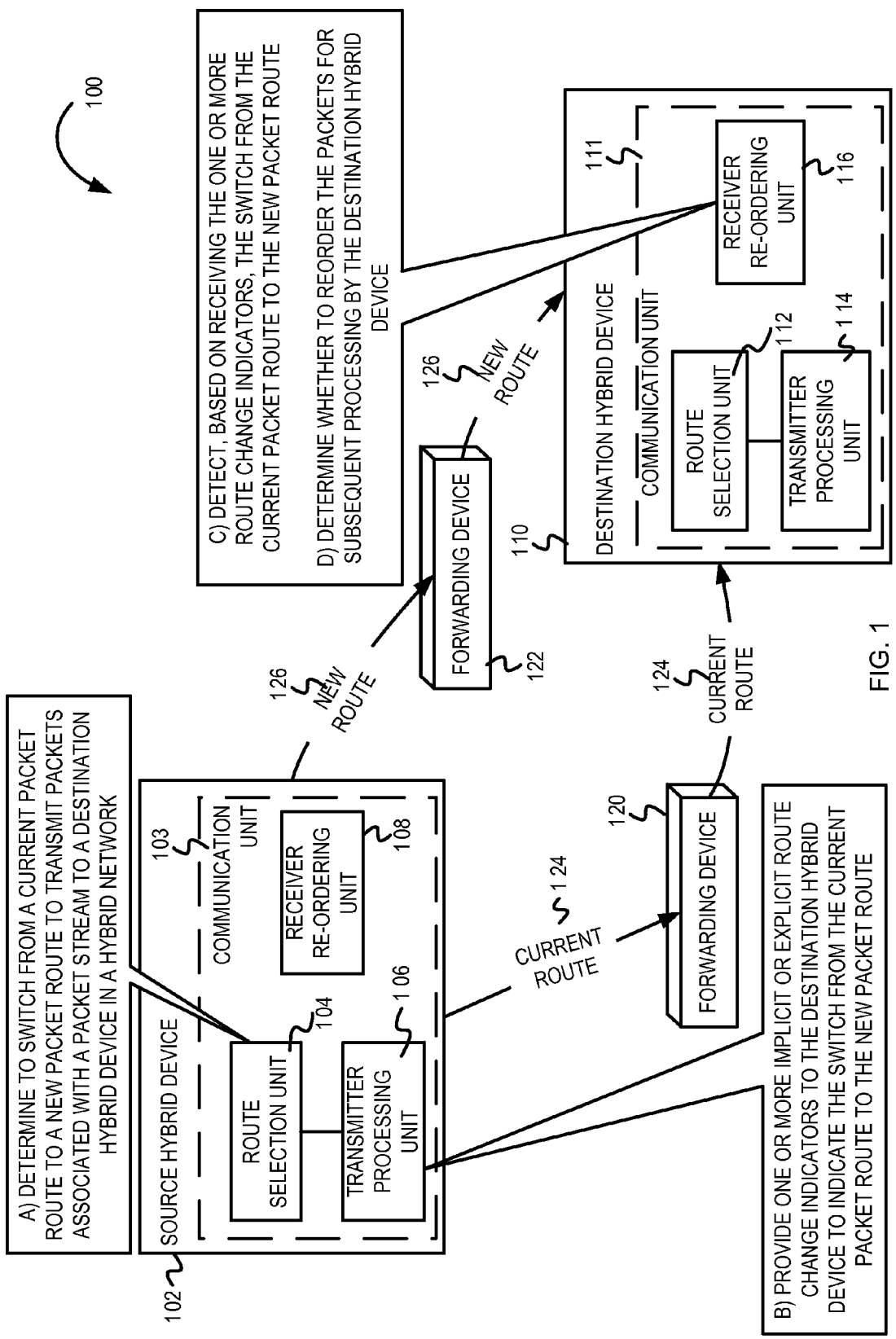
FIG. 1 is a block diagram illustrating an example mechanism for indicating packet route changes in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although in some embodiments the packet ordering mechanism can be implemented for hybrid communication networks comprising wireless local area network (WLAN) devices (e.g., IEEE 802.11 devices), powerline network devices (e.g., HomePlug AV) and Ethernet devices, in other embodiments the packet ordering mechanism can be implemented in hybrid communication networks that may comprise other suitable types of network devices that implement other standards/protocols (e.g., WiMAX, etc.). In other instances, well-known instruction instances, protocols, structures, and techniques have not been shown in detail in order not to obfuscate the description.

A source communication device typically transmits data to a destination communication device in an ordered sequence of packets. As part of analyzing the received data, the destination communication device typically ensures that the packets are processed in the same order as transmitted by the source communication device. Conventional communication networks typically provide a single route through the network between any two communication devices because the source and the destination communication devices typically utilize only a single interface for communicating with each other. However, hybrid communication networks are typically formed as an interconnection of communication network segments (sub-networks) across different network technologies and communication media. The hybrid communication networks typically comprise hybrid devices that include multiple network interfaces and are configured to operate across the different network technologies. The hybrid devices can use any one of the multiple interfaces to transmit/receive packets via the hybrid communication network. Consequently, multiple routes may exist between a source hybrid device and a destination hybrid device. For example, if the source hybrid device includes three network interfaces and the destination hybrid device includes two network interfaces, at least six routes may exist between the source and the destination hybrid devices. Because the source hybrid device can switch between multiple routes to transmit packets to the destination hybrid device, one or more packets may arrive out-of-order at the destination hybrid device. If the source hybrid device determines to use a first route to deliver a sequence of packets to the destination device, and then determines to change the route (due to changing channel conditions, network loading, etc.) to deliver subsequent packets, the route change can result in out-of-order packet delivery at the destination hybrid device and can disrupt operations of upper protocol layers or applications. When multiple routes are used to transmit packets that belong to the same packet stream, out-of-order packet delivery can occur if the packet transmission time associated with the different routes is different (e.g., due to network congestion, varying transmission rates, etc.), because of re-transmission of packets, and other such factors. Existing techniques for managing out-of-order packets are typically optimized for conventional communication devices that comprise a single network interface, for conventional communication networks that provide only a single route between device interfaces, or for communication devices that only use a single route even if multiple routes are available. Furthermore, some communication protocols (e.g., user datagram protocol (UDP)) employed by the destination hybrid device may not comprise inbuilt packet re-ordering mechanisms. The absence of reliable mechanisms for the source hybrid device to indicate a route change and/or for the destination hybrid device to manage out-of-order packets can reduce performance and throughput of the hybrid devices.

In some embodiments, hybrid devices can implement a mechanism to detect a change in the packet route, to manage out-of-order packet arrival, and to potentially perform re-ordering of the out-of-order packets. In one embodiment, the source hybrid device can delay transmission of packets that are to be transmitted along a new packet route to ensure that packets transmitted via the old packet route are received and provided to upper processing layers of the destination hybrid device before packets transmitted along the new packet route arrive at the destination hybrid device. In another embodiment, the source hybrid device can transmit route termination and route start indicators to indicate a change in the packet route and to initiate re-ordering at the destination hybrid device (if necessary). In another embodiment, the destination hybrid device can automatically detect route changes based on analyzing packet headers based on one or more of the packet arrival interface, packet route-indicating header information, packet route tagging, packet sequence numbers, packet timestamps, and/or packet signature analysis techniques. As will be further described below, these and other mechanisms for indicating a change in packet route and/or for packet ordering, as described herein, can enable the source hybrid device to indicate a change in the packet route and the destination hybrid device to manage out-of-order packet arrival that can result from packet route changes in the hybrid communication networks.

FIG. 1 is a block diagram illustrating an example mechanism for indicating packet route changes in a hybrid communication network 100. The hybrid communication network 100 comprises hybrid devices 102 and 110 and forwarding devices 120 and 122. The hybrid device 102 comprises a communication unit 103. The communication unit 103 comprises a route selection unit 104, a transmitter processing unit 106, and a receiver re-ordering unit 108. Likewise, the hybrid device 110 comprises a communication unit 111. The communication unit 111 comprises a route selection unit 112, a transmitter processing unit 114, and a receiver re-ordering unit 116. The forwarding devices 120 and 122 can be conventional (also known as legacy) communication devices or hybrid communication devices. In some implementations, the hybrid devices 102 and 110 can comprise multiple network interfaces each of which connect the hybrid device to different communication network segments. For example, the source hybrid device 102 and the destination hybrid device 110 can each comprise three network interfaces (e.g., a powerline interface, an Ethernet interface, and a WLAN interface) that enable the hybrid devices to connect to a powerline communication network segment, Ethernet, and a WLAN respectively.

Figure 2:
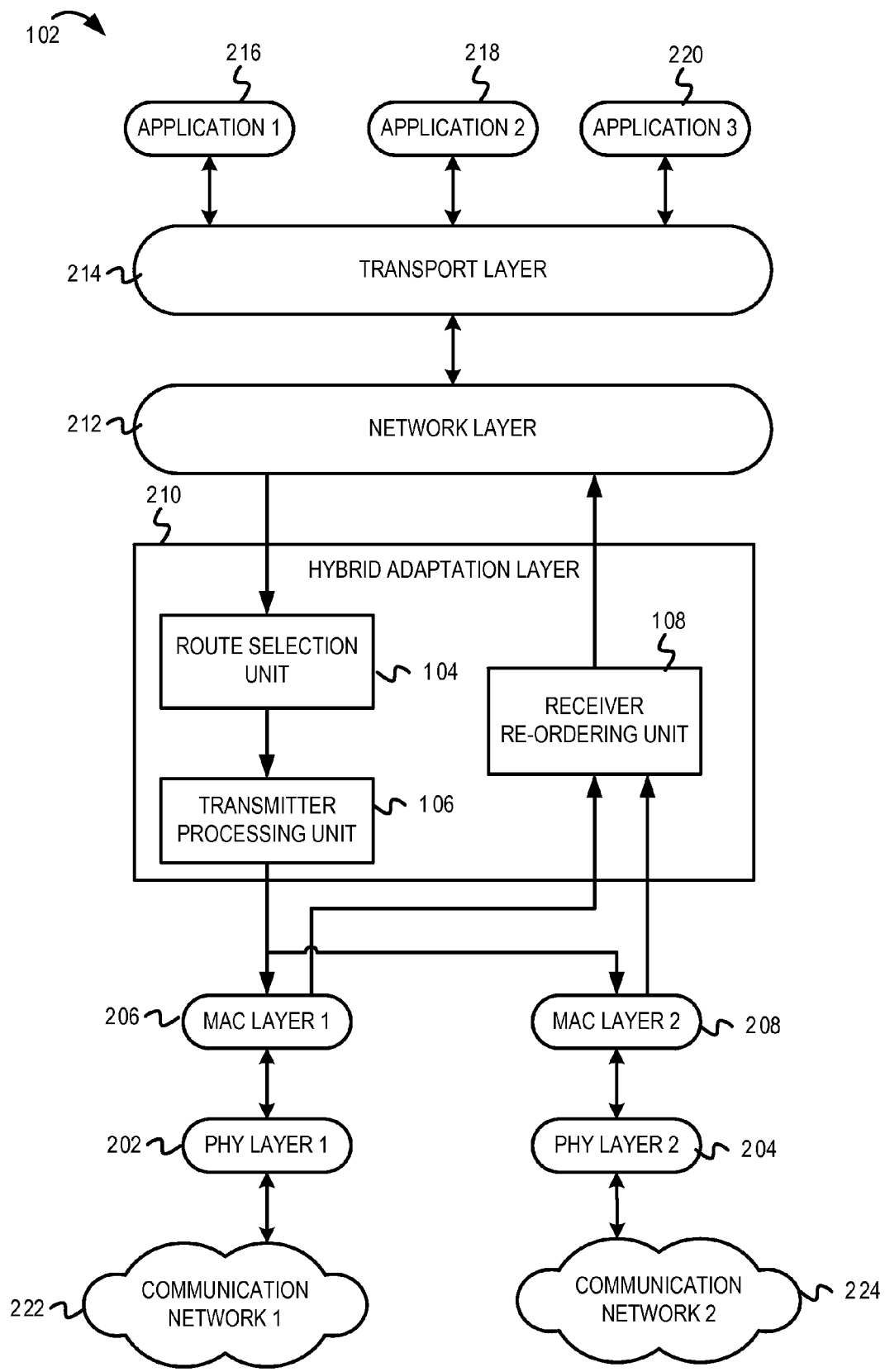
FIG. 2 is a conceptual diagram illustrating an example protocol stack for a hybrid device that implements multiple networking interfaces.

In one implementation, as depicted in FIG. 2, the networking functionality of the hybrid devices 102 and 110 can be partitioned into sub-functions using a "layered" approach, consistent with the International Standards Organization (ISO) Open Systems Interconnection (OSI) reference model. The set of networking protocol layers may be referred to as a "protocol stack." FIG. 2 depicts an example protocol stack for the hybrid device 102 that implements multiple networking interfaces. It is noted that although the protocol stack of FIG. 2 will be described in terms of the source hybrid device 102, the destination hybrid device 110 can also implement the same (or similar) protocol stack as depicted in FIG. 2. In the example of FIG. 2, the hybrid device 102 includes two communication interfaces. Therefore, the hybrid device 102 comprises two physical (PHY) layers 202 and 204 and two corresponding Medium Access Control (MAC) layers 206 and 208. The MAC layer 206 and the PHY 202 layer couple the hybrid device 102 to one communication network segment 222 (e.g., Ethernet). Similarly, the MAC layer 208 and the PHY layer 204 couple the hybrid device 102 to another communication network segment 224 (e.g., powerline communication network). It is noted that the communication network segments 222 and 204 can each be a portion of an extended bridged network, such as a hybrid communication network. The hybrid device 102 comprises a network layer 212. The network layer 212 can implement an Internet Protocol version 4 (IPv4) communication protocol, an Internet Protocol version 6 (IPv6) communication protocol, an AppleTalk® communication protocol, or other suitable network layer protocol. The source hybrid device 102 also implements a "hybrid adaptation layer" 210 between the network layer 212 and the MAC layers 206 and 208. In one example, as depicted in FIG. 2, the hybrid adaptation layer 210 can comprise the route selection unit 104, the transmitter processing unit 106, the receiver re-ordering unit 108, and other functionality for indicating a change in the packet route and for re-ordering out-of-order packets (which will be further described below with reference to FIGS. 1, and 3-5). The hybrid device 102 also comprises a transport layer 212 that operates across the network layer 212. The hybrid device 102 can implement transmission control protocol (TCP), user datagram protocol (UDP), or other suitable transport layer protocols depending on the network layer protocol implemented by the hybrid device 102. The hybrid device 102 also comprises three applications 216, 218, and 220 that utilize the protocol stack for communication with other devices.

In some implementations, the application layer (comprising the applications 216, 218 and 220), the transport layer 214, and the network layer 212 can be collectively referred to as "upper protocol layers." The MAC layers 206 and 208 and the PHY layers 202 and 204 can be collectively referred to as "lower protocol layers." The hybrid adaptation layer 210 can implement functionality for managing network communications in the hybrid device 102 with a single set of upper protocol layers (e.g., a single network layer and transport layer for each upper layer protocol type implemented) but with multiple networking interfaces (e.g., multiple PHY layers and MAC layers). In one implementation, the hybrid adaptation layer 210 can interface with the underlying MAC layers 206 and 208 to manage networking resources and to make rapid packet route changes that are transparent to the upper layers of the protocol stack. The hybrid adaptation layer 210 can also enable the upper protocol layers to operate as if the source hybrid device 102 comprises only a single MAC layer and a corresponding single PHY layer. It is noted that the protocol stack depicted in FIG. 2 illustrates one embodiment of the architecture of the hybrid devices 102 and 110. In other implementations, the hybrid devices 102 and 110 can comprise other suitable layers or sub-layers, depending on the networking technology and optional protocols that might be implemented. For example, some networking technologies may implement an Ethernet convergence layer above the MAC layer. As another example, some networking technologies may include a logical link control (LLC) protocol layer. Furthermore, in some implementations, one or more other sub-layers may execute functionality described herein in FIGS. 1, 3-6. Referring back to FIG. 1, in some implementations, the hybrid adaptation layer 210 of the hybrid device 102 can implement functionality to manage changes in the packet route used for transmitting packets to the hybrid device 110, as will be described below in stages A-B of FIG. 1.

At stage A, the route selection unit 104 of the hybrid device 102 ("source hybrid device") determines to switch from a current packet route 124 to a new packet route 126 to transmit packets associated with a packet stream, a set of packet streams, or packets sharing the current packet route 124 to the hybrid device 110 ("destination hybrid device"). In some examples, a packet stream can comprise a sequence of packets conveying data that are associated with the same application and that are part of the same communication connection or session. In some implementations, the route selection unit 104 may control the route changes of the source hybrid device 102. For example, the route selection unit 104 may determine if/when to switch from the current packet route, and which of the available packet routes should be selected as the new packet route. In some implementations, the route selection unit 104 can determine to switch from the current packet route 124 in response to detecting performance degradation on the current packet route 124. In another implementation, the route selection unit 104 can determine to switch from the current packet route 124 after a predetermined time interval. As depicted in the example of FIG. 1, there may be two possible packet routes 124 and 126 (or network paths) between the source hybrid device 102 and the destination hybrid device 110. As illustrated in FIG. 1, the packet route 124 may involve transmitting packets from the source hybrid device 102 to the destination hybrid device 110 via the forwarding device 120. The packet route 126 may involve transmitting packets from the source hybrid device 102 to the destination hybrid device 110 via the forwarding device 122. In some implementations, as depicted in FIG. 1, the packet routes 124 and 126 may differ in the forwarding devices (and other intermediate communication devices) that route that packet from the source hybrid device 102 to the destination hybrid device 110. In other implementations, the packet routes 124 and 126 may also differ in the network interface from which the packets are transmitted ("source communication interface"), the network interface at which the packets are received ("destination communication interface"), and/or the communication networks via which the packets are transmitted. In FIG. 1, the transmitter processing unit 106 may begin transmitting packets (via the forwarding device 120) to the destination hybrid device 110 along the current packet route 124. At stage A, the transmitter processing unit 106 determines to switch from the current packet route 124 to the new packet route 126 to transmit subsequent packets associated with the same packet stream (the set of packet streams or packets programmed to share a common route) to the destination hybrid device 110.

At stage B, the transmitter processing unit 106 provides one or more implicit or explicit route change indicators to the destination hybrid device 110 to indicate the switch from the current packet route 124 to the new packet route 126. In one implementation, the transmitter processing unit 106 can transmit a route termination indicator along the current packet route 124 to indicate termination of the current packet route 124. For example, the transmitter processing unit 106 can transmit a route termination packet after transmitting the last data/control packet along the current packet route 124. As another example, the transmitter processing unit 106 can provide a route termination tag as part of the last data/control packet transmitted along the current packet route 124. The transmitter processing unit 106 can also transmit a route start indicator along the new packet route 126 to indicate that subsequent packets will be transmitted via the new packet route 126. For example, the transmitter processing unit 106 can transmit a route start packet prior to transmitting the first data/control packet along the new packet route 126. As another example, the transmitter processing unit 106 can provide a route start tag as part of the first data/control packet transmitted along the new packet route 126. In some implementations, the route termination indicator (e.g., the route termination packet or the route termination tag) and the route start indicator (e.g., the route start packet or the route start tag) may be considered explicit route change indicators because additional data is added to the packet or additional data is transmitted in the packet to indicate the change in the packet route, as will be described further below. In some implementations, packet encodings can be considered implicit route change indicators because additional data is not transmitted in (or added to) the packet to indicate the change in the packet route. Instead, a change in the packet encoding can implicitly imply a change in the packet route, as will be described further below. As will be further described in FIGS. 3 and 4, the transmitter processing unit 106 can employ various other techniques including transmitting sequence numbers, changing the packet headers, etc. to either explicitly or implicitly indicate (e.g., to the destination hybrid device 110) the switch from the current packet route 124 to the new packet route 126. As will further be described in stages C and D, the destination hybrid device 110 can detect the switch from the current packet route 124 to the new packet route 126 based, at least in part, on the one or more route change indicators, can re-order the packets (if needed), and can process the packets in the correct sequence.

At stage C, the receiver re-ordering unit 116 of the destination hybrid device 110 detects the switch from the current packet route 124 to the new packet route 126, based on receiving the one or more route change indicators. In one implementation, the receiver re-ordering unit 116 can detect the change in packet route based on receiving one or more explicit route change indicators. For example, in response to detecting the route termination indicator (e.g., the route termination packet, the route termination tag, etc.), the receiver re-ordering unit 116 can determine that the current packet route 124 has been (or will be) terminated. Likewise, in response to detecting the route start indicator (e.g., the route start packet, the route start tag, etc.), the receiver re-ordering unit 116 can determine that the new packet route 126 has been initialized and that subsequent packets will be received via the new packet route 126. In other implementations, if explicit route change indicators (e.g., the route termination indicator and/or the route start indicator) are not detected, the receiver re-ordering unit 116 can detect the change in packet route based on detecting a change in packet headers (i.e., the implicit route change indicators). For example, the receiver re-ordering unit 116 can determine whether the source MAC address (or the source communication interface), the destination MAC address (or the destination communication interface), packet encoding, and/or other fields associated with the received packet are different from corresponding information associated with a previously received packet. Differences between the headers associated with a current received packet and previously received packets can indicate the switch from the current packet route 124 to the new packet route 126. Based on analyzing the packet headers associated with the received packets, the receiver re-ordering unit 116 can classify the packets as being associated with either the old packet route 124 (formerly referred to as the current packet route 124) or the new packet route 126. The destination hybrid device 110 can use any suitable classification techniques to determine which of the received packets belong to a particular packet stream (e.g., associated with a particular application), a set of packet streams, or a set of packets configured to share a common route, and to accordingly manage out-of-order packet arrival. As will further be described in FIG. 5, the receiver re-ordering unit 116 can detect the switch from the old packet route 124 to the new packet route 126 using various other techniques.

At stage D, the receiver re-ordering unit 116 determines whether to re-order the packets for subsequent processing by the destination hybrid device 110. As will be further described in FIG. 5, the receiver re-ordering unit 116 can employ various techniques to determine whether to re-order the packets received from the source hybrid device 102. For example, the receiver re-ordering unit 116 can determine to execute packet re-ordering operations if the receiver re-ordering unit 116 detects the route start indicator associated with the new packet route 126 prior to detecting the route termination indicator associated with the old packet route 124. As another example, the receiver re-ordering unit 116 can determine to execute the packet re-ordering operations if the receiver re-ordering unit 116 detects (e.g., based on reading sequence numbers associated with the packet) out-of-order packet arrival at the destination hybrid device 110. The receiver re-ordering unit 116 can implement various techniques to manage out-of-order packet arrival that result from route changes for delivery (from the source hybrid device 102 to the destination hybrid device 110) of a packet stream, a set of packet streams, or set of packets that are configured to share a common route. The receiver re-ordering unit 116 can temporarily store the out-of-order packets in a re-ordering buffer and can provide the packets in the correct order for subsequent processing by the destination hybrid device 110.

Although not depicted in FIG. 1, it is noted that in some implementations the source hybrid device 102 can employ time delay techniques to indicate a change in the current packet route and/or to maintain proper packet order at the destination hybrid device 110. As will be further described in FIG. 3, after transmitting the last packet along the current packet route 124, the transmitter processing unit 106 can wait (and prevent packet transmission) for a predetermined time interval ("route change wait time interval"). The route change wait time interval can be selected to ensure that the destination hybrid device 110 receives all the packets transmitted along the current packet route 124 before transmitting the packets via the new packet route 126. By enforcing the route change wait time interval, the source hybrid device 102 can attempt to ensure that any suitable destination device (e.g., conventional legacy destination devices, destination hybrid devices 110, etc.) can receive packets associated with a common packet stream in the correct order without relying on the destination device to implement packet re-ordering functionality. In other implementations, however, the destination device 110 may detect the time delay and may accordingly determine the change in the packet route. The destination device 110 may enable packet re-ordering functionality (e.g., the receiver re-ordering unit 116) in response to detecting the change in the packet route.

Figure 3:
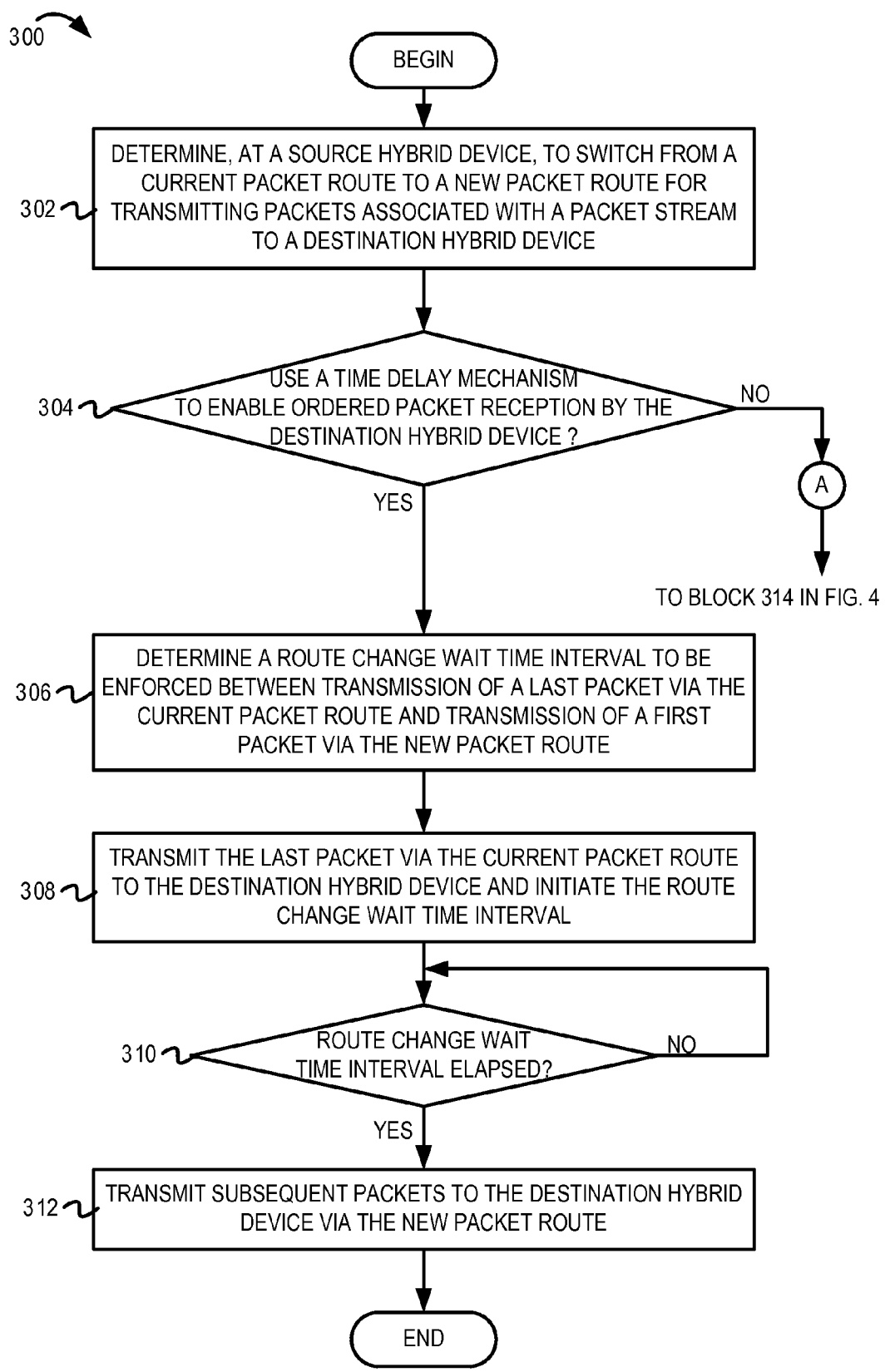
FIG. 3 is a flow diagram illustrating example operations of a source hybrid device indicating a change in packet routes for communicating with a destination hybrid device.
Figure 4:
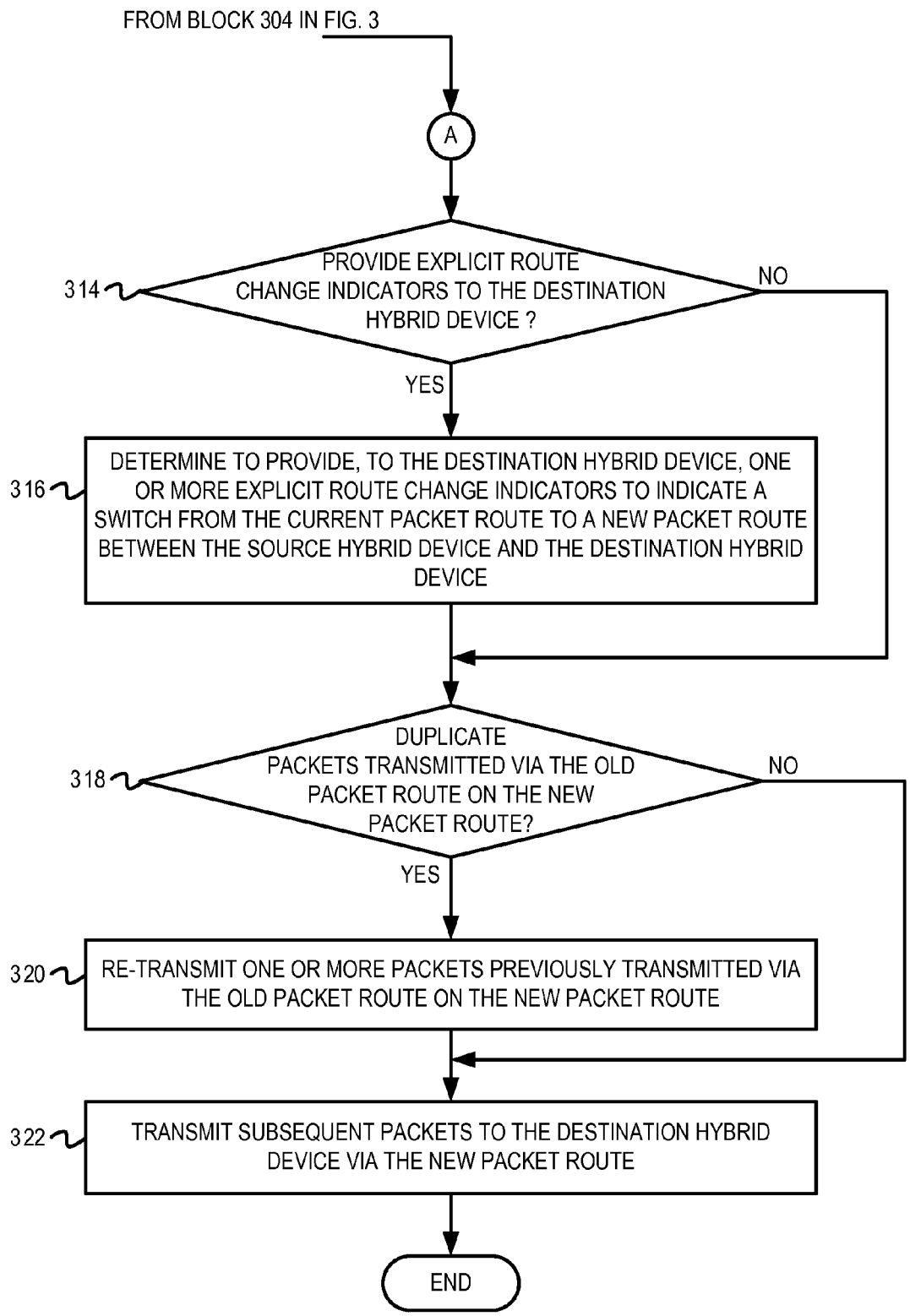
FIG. 4 is a continuation of FIG. 3 and also illustrates example operations of a source hybrid device indicating a change in packet routes for communicating with a destination hybrid device

FIG. 3 and FIG. 4 depict a flow diagram ("flow") 300 illustrating example operations of a source hybrid device indicating a change in packet routes for communicating with a destination hybrid device. The flow 300 begins at block 302 in FIG. 3.

At block 302, a source hybrid device determines to switch from a current packet route to a new packet route for transmitting packets associated with a common packet stream to a destination hybrid device. In some implementations, the source hybrid device determines to switch from the current packet route to the new packet route for transmitting packets associated with a set of packet streams or a set of packets configured to share a common packet route. With reference to the example of FIG. 1, the route selection unit 104 of the source hybrid device 102 can determine to switch from the current packet route 124 to the new packet route 126 for communicating with the destination hybrid device 110. The route selection unit 104 can determine to change the current packet route 124 in response to detecting performance degradation on the current packet route 124, after a predetermined time interval elapses, in response to detecting that the new packet route 126 has better performance characteristics, etc. The flow continues at block 304.

At block 304, it is determined whether to use a time delay mechanism to enable ordered packet reception by the destination hybrid device. For example, the transmitter processing unit 106 of the source hybrid device 102 can determine whether to employ the time delay mechanism for ordered packet reception by the destination hybrid device 110. In some implementations, the transmitter processing unit 106 can determine to use the time delay mechanism depending on the processing capabilities of the destination device 110. For example, the transmitter processing unit 106 can determine to use the time delay mechanism to enable ordered packet reception at the destination hybrid device 110. As another example, the transmitter processing unit 106 can determine to use the time delay mechanism to notify the destination hybrid device 110 of the change in the packet route, so that the destination device 110 can enable functionality for processing out-of-order packets. If it is determined that the time delay mechanism should be employed, the flow continues at block 306. Otherwise, the flow continues at block 314 in FIG. 4. It is noted that in some implementations, the source hybrid device 102 may not determine whether to implement the time delay mechanism (as described above in block 304). Instead, the source hybrid device 102 may be programmed to automatically implement the time delay mechanism in response to determining to switch from the current packet route to the new packet route.

At block 306, a route change wait time interval is determined. The route change wait time interval can be the time duration between transmission of a last packet via the current packet route 124 and transmission of a first packet via the new packet route during which the source hybrid device 102 may not transmit any packets to the destination hybrid device 110. In one implementation, the transmitter processing unit 106 can estimate the time required for a packet associated with a particular packet stream (or a set of packet streams or a set of packets configured to share a common packet route) to be delivered through the hybrid communication network 100 from the source hybrid device 102 to the destination hybrid device 110 (i.e., the round-trip time interval). The transmitter processing unit 106 can measure the round-trip time interval as the time from when a data packet is transmitted to the destination hybrid device 110 until the time that an upper protocol layer acknowledgement packet is received from the destination hybrid device 110. The transmitter processing unit 106 can then divide the calculated round-trip time interval in half to determine the route change wait time interval. In another implementation, the transmitter processing unit 106 can receive an indication of current packet route delays from one or more other network devices (e.g., legacy devices, hybrid devices, etc.) in the hybrid communication network 100 and can accordingly calculate the route change wait time interval. In some implementations, the transmitter processing unit 106 can calculate the route change wait time interval based on the estimated packet delivery time along the current packet route 124 to ensure that packets arrive in-order at the destination hybrid device 110. In another implementation, the transmitter processing unit 106 can add some margin to the route change wait time interval to account for uncertainty in latency associated with the hybrid communication network 100. In another implementation, the transmitter processing unit 106 can estimate the packet delivery time associated with the new packet route 126 and can reduce the route change wait time interval accordingly. In this implementation, the route change wait time interval can be calculated as the difference between the latency associated with the old packet route 124 and the latency associated with the new packet route 126. The flow continues at block 308.

At block 308, the last packet is transmitted to the destination hybrid device via the current packet route and the route change wait time interval is initiated. For example, in response to determining that the last packet was transmitted via the current packet route 124, the transmitter processing unit 106 can start a timer to initiate the route change wait time interval. The transmitter processing unit 106 may not transmit any packets to the destination hybrid device 110 while the route change wait time interval is being enforced. The flow continues at block 310.

At block 310, it is determined whether the route change wait time interval is elapsed. For example, the transmitter processing unit 106 can determine whether the route change wait time interval is elapsed. In some implementations, the transmitter processing unit 106 may receive an interrupt (or another suitable trigger/indicator) when the route change wait time interval elapses. In some implementations, the source hybrid device 102 can employ a transmit packet buffer to store packets that are generated during the route change wait time interval that are scheduled to be transmitted via the new packet route 126. The flow continues at block 312.

At block 312, subsequent packets are transmitted to the destination hybrid device via the new packet route. After the route change wait time interval elapses, the transmitter processing unit 106 can transmit subsequent packets to the destination hybrid device 110 via the new packet route 126. From block 312, the flow ends.

At block 314 in FIG. 4, it is determined whether the source hybrid device should provide one or more explicit route change indicators to the destination hybrid device to indicate the switch in the current packet route. In one example, the flow 300 moves from block 304 of FIG. 3 to block 314 of FIG. 4 in response to determining that the time delay mechanism should not be employed at the source hybrid device 102. At block 314, the transmitter processing unit 106 can determine whether one or more explicit route change indicators should be provided to the destination hybrid device 110. If it is determined that the destination hybrid device 110 should be explicitly notified of the switch in the current packet route, the flow continues at block 316. Otherwise, the flow continues at block 318. It is noted that, in some implementations, the transmitter processing unit 106 may not explicitly provide an indication (e.g., the route termination indicator and/or the route start indicator) of the change in the packet route to the destination hybrid device 110. Instead, the transmitter processing unit 106 can simply transmit the packets to the destination hybrid device 110. The transmitter processing unit 106 can rely on the destination hybrid device 110 to use and analyze implicit route change indicators (e.g., based on analysis of the packet header) to detect the change in the packet route. For example, as will be further described in FIG. 5, a change in the source MAC address associated with a current transmitted packet and previously transmitted packets can serve as an implicit route change indicator. It is noted that in some implementations, the source hybrid device 102 may not determine whether to provide the explicit route change indicators to the destination hybrid device 110 (as described above in block 314). Instead, the source hybrid device 102 may be programmed to automatically execute operations for providing the explicit route change indicators to the destination hybrid device 110 in response to determining to switch from the current packet route 124 to the new packet route 126.

At block 316, the source hybrid device determines to provide one or more explicit route change indicators to the destination hybrid device to indicate a switch from the current packet route to the new packet route. In one example, the flow 300 moves from block 314 to block 316 in response to determining that the destination hybrid device 110 should be explicitly notified of the change in the packet route. The transmitter processing unit 106 can employ various techniques to explicitly indicate the switch from the current packet route 124 (subsequently referred to as the "old packet route 124") to the new packet route 126, as will be described below.

In one embodiment, the transmitter processing unit 106 can provide a route termination indicator via the old packet route 124 to indicate termination of the old packet route 124 between the source hybrid device 102 and the destination hybrid device 110. For example, the transmitter processing unit 106 can transmit a route termination control packet along the old packet route 124 immediately after transmitting the last packet (e.g., associated with a stream, an application, a set of streams, or a set of packets configured to share a common route) along the old packet route 124. The route termination control packet can comprise classification information for identifying the stream (application, set of streams, or the set of packets configured to share a common route), whose packet route is being changed, and optionally, as described below, how to distinguish between the packets transmitted along the old packet route 124 and the packets transmitted along the new packet route 126. As another example, the transmitter processing unit 106 can insert a route termination tag in the last packet transmitted along the old packet route 124. The route termination tag may be indicated using a unique coding of a special virtual local area network (VLAN) tag, using an EtherType tag, using one or more pre-existing fields in the packet header, by adding one or more extra bits to the header, or using other suitable mechanisms. The value of the tag that indicates termination of the old packet route 124 can be predetermined or can be negotiated between the source hybrid device 102 and the destination hybrid device 110. In some implementations, the route termination tag can comprise a counter that indicates the number of packets that will be transmitted via the old packet route 124 before the old packet route 124 is terminated. For example, the counter can comprise a value of "3," "2," and "1" to identify the third to last, second to last, and the last packets, respectively, that are transmitted via the old packet route 124. In some implementations, the transmitter processing unit 106 can transmit multiple route termination packets to improve the probability that the destination hybrid device 110 receives at least one route termination packet. Likewise, the transmitter processing unit 106 can transmit the route termination tag in two or more of the last set of packets transmitted via the old packet route 124 to improve the probability that the destination hybrid device 110 receives at least one route termination tag.

The transmitter processing unit 106 can also provide a route start indicator via the new packet route 126 to indicate that subsequent packets will be transmitted along the new packet route 126. For example, the transmitter processing unit 106 can transmit a route start packet along the new packet route 126 before transmitting the first packet associated with the stream, streams, or set of packets sharing a common route, along the new packet route 126. As described above, the route start packet can also comprise the stream classification information for identifying the stream, streams, or set of packets sharing a common route whose packet route is being changed, and/or how to distinguish between packets transmitted along the old packet route 124 and packets transmitted along the new packet route 126. As another example, the transmitter processing unit 106 can insert a route start tag in the first data packet transmitted along the new packet route 126. In some implementations, the route start tag can comprise a counter that indicates the number of packets that have been transmitted via the new packet route 126. For example, the counter can comprise a value of "1," "2," and "3" to identify the first, second, and third packets, respectively, that are transmitted via the new packet route 126. In some implementations, the transmitter processing unit 106 can transmit multiple route start packets (or can transmit the route start tag in one or more of the first set of packets transmitted via the new packet route 126) to improve the probability that the destination hybrid device 110 receives at least one route start indicator.

In another embodiment, the transmitter processing unit 106 can indicate the sequence of the packets transmitted via the old packet route 124 and the new packet route 126. In one implementation, the transmitter processing unit 106 can determine to insert sequence numbers (e.g., which may be different from the sequence numbers inserted by upper protocol layers of the source hybrid device 102) in response to anticipating (or detecting) a change in the packet route. In one implementation, the transmitter processing unit 106 can insert the sequence numbers into one or more packets using special VLAN tag encodings reserved for indicating the change in the packet route, a new tag based on a predetermined EtherType value, unused packet fields in the packet header, extra bits added to the header, or other suitable techniques. In some implementations, in response to detecting a pending switch in the packet route, the transmitter processing unit 106 can insert sequence numbers in one or more of the last set of packets transmitted via the old packet route 124. In one example, the last set of packets can comprise one or more packets that are transmitted while the new packet route 126 is being selected and/or being set up. After switching to the new packet route, the transmitter processing unit 106 can then insert the sequence numbers in one or more of the first set of packets transmitted via the new packet route 126 (e.g., until the transition period is complete and the old packet route 124 is completely terminated). The sequence numbers associated with the first set of packets transmitted via the new packet route 126 can follow the sequence numbers associated with the last set of packets transmitted via the old packet route 124. For example, if the last set of packets transmitted via the old packet route 124 were associated with sequence numbers "1," "2," and "3," the first set of packets transmitted via the new packet route 126 may be associated with sequence numbers "4," "5," and so on. In some implementations, the route change may be in response to a precipitous failure of the old packet route 124 and the transmitter processing unit 106 may be unable to insert the sequence numbers into packets transmitted via the old packet route 124 to indicate an impending change in the packet route. In this implementation, the transmitter processing unit 106 can insert sequence numbers in one or more of the first packets transmitted along the new packet route 126. The presence of the sequence numbers can indicate (e.g., to the destination hybrid device 110) the change in the packet route. In some implementations, the sequence numbers can be synchronized to start at zero for each route change. For example, the first packet transmitted via the new packet route 126 may be associated with a sequence number of "0," the second packet transmitted via the new packet route 126 may be associated with a sequence number of "1," and so on. In another implementation, the source hybrid device 102 and the destination hybrid device 110 can exchange one or more messages (e.g., by executing a handshake mechanism) to negotiate and synchronize sequence numbers. It is noted that various other types of route change indicators (e.g., timestamps) can be used independently, in conjunction with each other, or in conjunction with the route change indicators listed above.

At block 318, it is determined whether packets transmitted via the old packet route should be duplicated on the new packet route. For example, the transmitter processing unit 106 can determine whether one or more packets transmitted via the old packets route 124 should be re-transmitted (e.g., to the destination hybrid device 110) via the new packet route 126. If it is determined that packets transmitted via the old packet route should be duplicated on the new packet route, the flow continues at block 320. Otherwise, the flow continues at block 322. It is noted that the source hybrid device 102 may not determine whether transmitted via the old packet route should be duplicated on the new packet route (as described above in block 318). Instead, in some implementations, the source hybrid device 102 may be programmed to automatically execute the operations of block 322 for transmitting the packets via the new packet route. In other implementations, source hybrid device 102 may be programmed to automatically execute operations of block 320 for duplicating one or more packets transmitted via the old packet route on the new packet route.

At block 320, one or more packets previously transmitted via the old packet route are re-transmitted on the new packet route. In one example, the flow 300 moves from block 318 to block 320 if it is determined that one or more packets transmitted via the old packet route should be duplicated on the new packet route. In one example, the transmitter processing unit 106 can transmit a duplicate of a packet by transmitting a copy of the same packet along both the old packet route 124 and the new packet route 126 to improve the probability that the packet is successfully delivered to the destination hybrid device 110 and/or to reduce packet delivery latency. Changes in the packet route are typically in response to degradation in the delivery characteristics (e.g., throughput, latency, error rate, reliability, etc.) associated with the old packet route 124. The effect of degradation of the old packet route 124 can be mitigated by configuring the source hybrid device 102 to transmit one or more duplicate packets. In some implementations, the transmitter processing unit 106 may only re-transmit (on the new packet route 126) the last packet transmitted via the old packet route 124. In another implementation, the transmitter processing unit 106 may re-transmit (along the new packet route 126) all the packets previously transmitted on the old packet route 124 that have not been acknowledged by the destination hybrid device 110. In another implementation, the transmitter processing unit 106 may re-transmit any suitable number of packets (previously transmitted via the old packet route 124) along the new packet route 126. The destination hybrid device 110 can detect and discard the duplicate packets (as will be further described below). The flow continues at block 322.

At block 322, subsequent packets are transmitted to the destination hybrid device via the new packet route. For example, the transmitter processing unit 106 can transmit subsequent packets to the destination hybrid device 110 via the new packet route 126. From block 322, the flow ends.

It should be noted that although FIG. 4 depicts the source hybrid device 102 executing sequential operations for determining whether to explicitly notify the destination hybrid device of the switch in the current packet route (block 314) and whether to re-transmit one or more packets via the new packet route (block 320), embodiments are not so limited. In other embodiments, the decision operations described above in blocks 314 and 320 may be executed in parallel, in a different order, one or more of the decision operations (described above in blocks 314 and 320) may not be executed, etc. In some implementations, the transmitter processing unit 106 can execute a combination of techniques for indicating the change in the packet route. For example, the transmitter processing unit 106 can transmit the sequence numbers in one or more packets and can also duplicate the one or more packets (including the sequence numbers) on the new packet route. The destination hybrid device 110 may detect the duplicate packets based on the sequence numbers. As another example, the transmitter processing unit 106 may not re-transmit (via the new packet route 126) packets that were previously transmitted via the old packet route 124. Instead, the transmitter processing unit 106 may insert sequence numbers (as described above) in one or more packets transmitted on the old and the new packet routes and may rely on the destination hybrid device 110 to detect and indicate omissions in transmitted packets (e.g., by detecting packets with non-sequential numbers).

Figure 5:
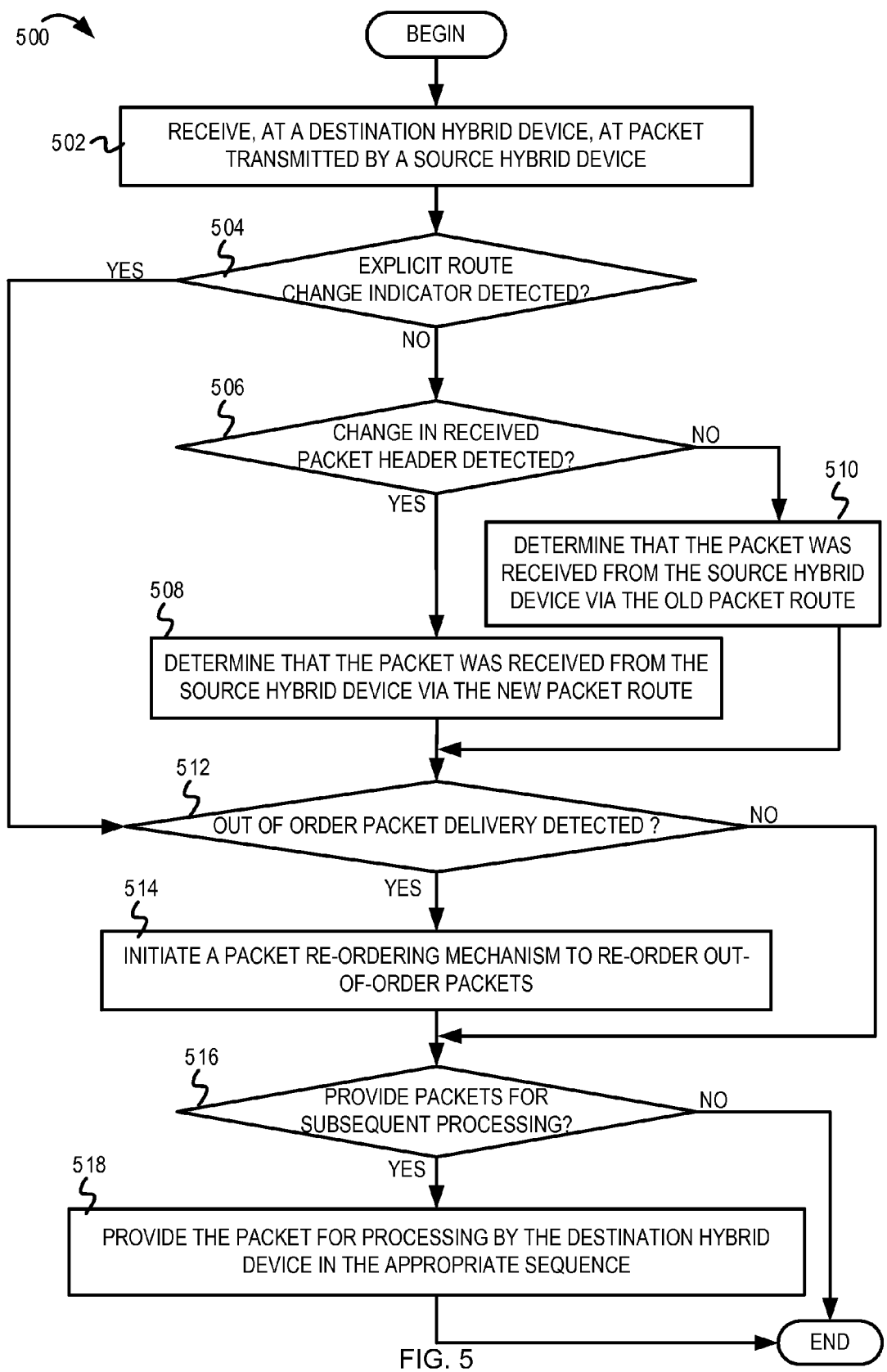
FIG. 5 is a flow diagram illustrating example operations of a destination hybrid device detecting a change in the packet route between the source and the destination hybrid devices.

FIG. 5 is a flow diagram 500 illustrating example operations of a destination hybrid device detecting a change in the packet route between the source and the destination hybrid devices. The flow 500 begins at block 502 in FIG. 5.

At block 502, a destination hybrid device receives a packet transmitted by a source hybrid device. With reference to the example of FIG. 1, the receiver re-ordering unit 116 of the destination hybrid device 110 can receive the packet transmitted by the source hybrid device 102. The flow continues at block 504.

At block 504, it is determined whether an explicit route change indicator was received at the destination hybrid device 110. For example, the receiver re-ordering unit 116 can determine whether one or more explicit route change indicators were received from the source hybrid device 102. The receiver re-ordering unit 116 can determine whether a route termination packet, a route termination tag, and/or other suitable route termination indicator(s) were detected at the destination hybrid device 110. Detecting the route termination indicator can indicate that the current packet route 124 between the source hybrid device 102 and the destination hybrid device 110 will be terminated. The receiver re-ordering unit 116 can also determine whether a route start packet, a route start tag, and/or other route start indicator(s) were detected on a new packet route 126. Detecting the route start indicator can indicate that subsequent packets from the source hybrid device 102 will be received along the new packet route 126. Additionally, as described above, the receiver re-ordering unit 116 can also determine whether one or more other explicit route change indicators (e.g., special VLAN tags) were detected. If it is determined that one or more explicit route change indicators were received, the flow continues at block 512. Otherwise, the flow continues at block 506.

At block 506, it is determined whether a change in a packet header associated with the received packet was detected. The flow moves from block 504 to block 506 if it is determined that one or more explicit route change indicators were not received at the destination hybrid device 110. In one implementation, the receiver re-ordering unit 116 can use packet classification techniques (e.g., based on one or more fields in the headers associated with the received packets) to sort the received packets into streams. The receiver re-ordering unit 116 can automatically detect a change in the packet route based on detecting a change in the headers associated with the received packets belonging to the same packet stream (e.g., originating from the same application), a set of packet streams, or packets configured to share a common route. The receiver re-ordering unit 116 can also automatically detect a change in the packet route based on determining that packets belonging to the same packet stream, set of packet streams, or packets configured to share a common route were received on different network interfaces.

In some implementations, the receiver re-ordering unit 116 can distinguish between packets received via the old packet route 124 and the new packet route 126 based on detecting differences between the packet headers associated with the old packet route 124 and the new packet route 126. For example, the old packet route 124 and the new packet route 126 may correspond to different source communication interfaces. Accordingly, based on reading the MAC source address field of the received packets, the receiver re-ordering unit 116 can detect a change in the packet route and can determine whether the packet was received via the old packet route 124 or the new packet route 126. It is noted that the receiver re-ordering unit 116 can use other addressing differences and packet header differences to distinguish between packets transmitted via the old packet route 124 and the new packet route 126. For example, the receiver re-ordering unit 116 can detect a difference in communication protocols implemented on the old packet route 124 and the new packet route 126 (e.g., based on differences in VLAN identifiers or other stream identifiers that may be used by underlying protocol layers). As another example, the receiver re-ordering unit 116 can use packet header fields associated with intermediate forwarding devices to determine whether the packet was routed by a different forwarding device (i.e., whether the packet was received via a different packet route). As another example, the receiver re-ordering unit 116 can detect a change in the packet header based on detecting new bits (or fields) inserted in the received packet header, bits (or fields) removed from the received packet header, a different header format, a different header encoding, and other differences in packet header characteristics. If it is determined that a change in the packet header associated with the received packet was detected, the flow continues at block 508. Otherwise, the flow continues at block 510.

At block 508, the destination hybrid device determines that the packet was received from the source hybrid device via the new packet route. In one example, receiver re-ordering unit 116 can determine that the packet was received from the source hybrid device 102 via the new packet route 126 in response to determining that a change in the packet header associated with the received packet was detected (at block 506). The flow continues at block 512.

At block 510, the destination hybrid device determines that the packet was received from the source hybrid device via the old packet route. In one example, receiver re-ordering unit 116 can determine that the packet was received from the source hybrid device 102 via the old packet route 124 in response to not detecting a change in the packet header associated with the received packet (at block 506). The flow continues at block 512.

At block 512, it is determined whether an out-of-order packet delivery was detected at the destination hybrid device. The flow moves from block 504 to block 512 if the receiver re-ordering unit 116 detects one or more explicit route change indicators transmitted by the source hybrid device 102. The flow 500 also moves from block 508 and block 510 after the receiver re-ordering unit 116 determines whether the packet was received via the old packet route 124 or the new packet route 126. In one example, the receiver re-ordering unit 116 can determine whether the route start indicator was detected on the new packet route 126 prior to detecting the route termination indicator on the old packet route 124. If so, the receiver re-ordering unit 116 can determine that the change in the packet route (at the source hybrid device 102) resulted in out-of-order packet arrival at the destination hybrid device 110 (e.g., because of difference in latencies associated with the old and the new packet routes). As another example, in response to determining that the route termination indicator was received prior to the route start indicator, the receiver re-ordering unit 116 can determine that the change in the packet route did not result in out-of-order packet arrival at the destination hybrid device 110. Consequently, the receiver re-ordering unit 116 may not initiate packet re-ordering operations, thus avoiding unnecessarily consuming processor and re-ordering buffer resources. Instead, the receiver re-ordering unit 116 can discard the route termination indicator and the route start indicator and can provide subsequently received packets to the upper protocol layers (for processing) in the order in which they are received. As another example, the receiver re-ordering unit 116 can determine whether one or more packets comprising a first packet header (associated with the old packet route 124) were received after one or more packets comprising a second packet header (associated with the new packet route 126). If so, the receiver re-ordering unit 116 may determine to initiate packet re-ordering operations, as will be described in block 514. If it is determined that out-of-order packet delivery was detected at the destination hybrid device, the flow continues at block 514. Otherwise, the flow continues at block 516.

At block 514, a packet re-ordering mechanism is initiated at the destination hybrid device to re-order the out-of-order packets. For example, in response to determining a potential out-of-order packet arrival at the destination hybrid device 110, the receiver re-ordering unit 116 can initiate operations for re-ordering subsequently received packets to ensure that packets received via the new packet route 126 are provided to the upper protocol layers only after the packets received via the old packet route 124 are provided to the upper protocol layers. In response to determining an out-of-order packet arrival at the destination hybrid device 110, the receiver re-ordering unit 116 can temporarily store the out-of-order packets (e.g., packets that are not next in sequence order) in a re-ordering buffer. The receiver re-ordering unit 116 can employ various techniques to determine the correct order in which received packets should be provided for subsequent processing by the upper protocol layers (e.g., by the network layer 212, the transport layer 214, and the application 216) and to consequently determine the order in which the packets should be released from the re-ordering buffer. In one implementation, if the new packet route 126 and the old packet route 124 are associated with different destination communication interfaces, the receiver re-ordering unit 116 can store (in the re-ordering buffer) all the packets received on the destination communication interface associated with the new packet route 126. In another implementation, if the route start indicator is received prior to the route termination indicator, the receiver re-ordering unit 116 can store all the packets received (on the new packet route 126) after the route start indicator but before the route termination indicator. In another implementation, the receiver re-ordering unit 116 can use packet sequence identifiers (e.g., sequence numbers, timestamps, etc.) inserted by the upper protocol layers to determine the order in which the packets were transmitted by the source hybrid device 102, and consequently, to determine the order in which the packets should be processed. For example, the TCP layer 214 of the source hybrid device 102 may insert a 32-bit sequence number into each packet (prior to transmission). The receiver re-ordering unit 116 can read the sequence number associated with each of the incoming packets (e.g., using a packet inspection mechanism that analyzes headers and other information that were inserted in the received packets by upper protocol layers of the source hybrid device 102) to establish the correct order of the received packets. If a packet is received at the destination hybrid device 110 with a sequence number that is greater than the expected sequence number (based on the last packet in sequence received), the received packet and all subsequent received packets can be stored in the re-ordering buffer, until the next packet in the sequence is received. In another implementation, the receiver re-ordering unit 116 can use extra sequence identifiers inserted by the transmitter processing unit 106 (to explicitly indicate the change in the packet route change) for re-ordering to establish the order in which the packets should be processed by the destination hybrid device 110. The flow then continues at block 516.

At block 516, the destination hybrid device determines whether to provide packets for subsequent processing. For example, the receiver re-ordering unit 116 can determine whether the packets in the re-ordering buffer should be provided for subsequent processing by the upper protocol layers of the destination hybrid device 110. In maintaining the re-ordering buffer, the destination hybrid device 110 can attempt to release (for subsequent processing) packets received via the old packet route 124 before releasing packets received via the new packet route 126. In some implementations, the receiver re-ordering unit 116 can execute the re-ordering operations until the route termination indicator is received. In some implementations, the receiver re-ordering unit 116 can suspend the packet re-ordering operations after the last packet associated with the old packet route 124 is received. The receiver re-ordering unit 116 can provide the packets in the re-ordering buffer to the upper protocol layers in the correct order, in response to receiving the route termination indicator. In some implementations, to guard against the destination hybrid device 110 waiting indefinitely to receive a dropped/discarded packet (or against excessive packet delivery delay), the destination hybrid device 110 can employ a time-out mechanism to release packets from the re-ordering buffer after a predetermined buffer time interval elapses. The predetermined buffer time interval may be determined based, at least in part, on the expected round-trip acknowledgement time and re-transmission delay. In one implementation, if the destination hybrid device 110 fails to receive a packet in sequence within the predetermined buffer time interval, then the destination hybrid device 110 may determine that the re-transmission failed, that the packet will not be delivered, and may release packets from the re-ordering buffer with greater sequence numbers than the failed packet. It is noted that the receiver re-ordering unit 116 may also suspend the packet re-ordering operations after the predetermined buffer time interval elapses. In another implementation, the destination hybrid device 110 can release the packets for subsequent processing when the re-ordering buffer becomes full or exceeds a threshold level. In some implementations, missing packets can be discarded if they are received after the predetermined buffer time interval elapses. In some implementations, the receiver re-ordering unit 116 can record a packet identifier associated with the last packet in sequence that is provided for subsequent processing (e.g., to the upper protocol layers). The receiver re-ordering unit 116 can discard subsequently received packets associated with packet identifiers that are earlier in sequence than the released packet. In some implementations, the receiver re-ordering unit 116 can detect re-transmitted packets by observing acknowledgement packets, and/or by inferring re-transmission by arrival timing, arrival interface, route-indicating headers, or other packet header fields. Depending on the implementation, the receiver re-ordering unit 116 may or may not provide the re-transmitted packets for subsequent processing. If it is determined that the packets should be provided for subsequent processing, the flow continues at block 518. Otherwise, the flow ends.

At block 518, the packet is provided for processing by the destination hybrid device 110 in the appropriate sequence. For example, the receiver re-ordering unit 116 can provide the packet for processing by the upper protocol layers of destination hybrid device 110 in the appropriate sequence. From block 518, the flow ends.

It should be understood that FIGS. 1-5 are examples meant to aid in understanding embodiments and should not be used to limit embodiments or limit scope of the claims. Embodiments may perform additional operations, fewer operations, operations in a different order, operations in parallel, and some operations differently. For example, in some implementations, the source hybrid device 102 may be configured to wait for an acknowledgement (e.g., from the destination hybrid device 110) to the route change indicators (e.g., the route termination packet, the route start packet, a control/data packet comprising the route termination tag, a control/data packet comprising the route start tag, etc.). The source hybrid device 102 may retransmit the route change indicators until the acknowledgement is received or until a predetermined time interval elapses. The source hybrid device 102 may not transmit a packet via the new packet route 126 until the route change indicators have been acknowledged. In other implementations, however, the source hybrid device 102 may not wait for an acknowledgement from the destination hybrid device 110. Instead, the source hybrid device 102 may transmit a packet via the new packet route 126 after transmitting the route change indicators and without waiting for an acknowledgement.

In some implementations, the source hybrid device 102 can transmit an indication of packet identifiers or packet classification information and the order in which the packets were transmitted by the source hybrid device 102. The destination hybrid device 110 can use this packet order information to determine the correct order in which the packets should be organized and processed. The source hybrid device 102 can transmit the packet order information in the route termination packet, the route start packet, or in a separate control packet.

It is noted that, in some implementations, the transmitter processing unit 106 can employ two special route tags (e.g., tag A and tag B) to indicate a change in the packet route. The transmitter processing unit 106 can switch between tag A and tag B depending on the route along which the packet is to be transmitted. For example, the route selection unit 104 may select a first packet route and the source hybrid device 102 may transmit packets including tag A to the destination hybrid device 110 along the first packet route. In response to switching from the first packet route to a second packet route, the source hybrid device 102 may transmit packets including the tag B along the second packet route. If subsequently the source hybrid device 102 switches from the second packet route to a third packet route, the source hybrid device 102 can use tag A again to transmit packets (including the tag A) along the third packet route. The switch in the tag associated with the packet can indicate a corresponding switch in the packet route between the source hybrid device 102 and the destination hybrid device 110. In another implementation, the source hybrid device 102 can insert a "new route" tag into one or more packets transmitted along the new packet route 126 (e.g., into a predetermined number of packets or into packets transmitted during a predetermined time interval). The predetermined number of packets and the predetermined time interval can be determined based, at least in part, on the latencies between the old packet route 124 and the new packet route 126. As described above, the tags can be indicated using a predetermined VLAN tag encoding, using one or more predetermined bits in the VLAN tag, using an EtherType tag, using other existing unused packet fields, using one or more extra bits, or using other suitable mechanisms. For example, the transmitter processing unit 106 can employ two different tag encodings and can switch between the tag encodings when the packet route is changed. The tag encodings can be used in all packets transmitted via the packet routes or in a subset of packets transmitted along the packet routes. As described above in FIG. 5, marking packets delivered along the new packet route can enable the destination hybrid device 110 to identify these packets and to temporarily store the packets received on the new packet route 126 in the re-ordering buffer until all the packets delivered along the old packet route 124 have been provided to the upper protocol layers.

Although FIG. 3 depicts the time delay mechanism and the transmission of the route change indicators as being mutually exclusive operations, embodiments are not so limited. In other embodiments, the source hybrid device 102 can try to ensure proper transition between the old packet route 124 and the new packet route 126 using the time delay mechanism and can provide one or more route change indicators to the destination hybrid device 110. For example, on determining to switch to the new packet route 126, the source hybrid device 102 can transmit the route termination packet along the old packet route 124. The source hybrid device 102 can then initiate and enforce the route change wait time interval. After the route change wait time interval elapses, the source hybrid device 102 can transmit the route start packet along the new packet route 126.

Although FIG. 5 describes the destination hybrid device 110 re-ordering packets in response to detecting an out-of-order packet delivery, embodiments are not so limited. In some embodiments, in-order packet delivery to upper protocol layers may not be necessary or useful at the destination hybrid device 110 (e.g., depending on the communication protocol being employed, an application for which the packets are destined, and other such factors). In some implementations, prior to determining whether an out-of-order packet delivery was detected at the destination hybrid device 110 (at block 512 of FIG. 5), it may be determined whether delivering packets in order to the upper protocol layers of the destination hybrid device 110 is necessary or useful.

Although not described in the Figures, the destination hybrid device 110 can implement functionality for detecting and discarding duplicate packets received from the source hybrid device 102. In some implementations, duplicate packet detection can be performed using packet sequence numbers or packet timestamps (e.g., if the duplicate packets are assigned the same timestamp) inserted in the packets by the transmitter processing unit 106 (or the upper protocol layers) of the source hybrid device 102. In another implementation, packet signature analysis techniques can be employed to detect duplicate packets. For example, a cyclic redundancy check (CRC) calculation method (or another suitable calculation method that is independent of the packet route) can be used to generate a packet signature (e.g., a CRC value). If the destination hybrid device 110 detects two packets with the same packet signature, this can indicate that the two detected packets are duplicates of each other. The destination hybrid device 110 can maintain a record of the packet signatures associated with recently received packets and can use this record of received packet signatures to detect and discard duplicate packets.

It is noted that in some implementations, the route change wait time interval and/or the predetermined buffer time interval may be determined based, at least in part, on multiple round-trip delays if the communication protocol employed by the source hybrid device 102 and the destination hybrid device 110 support multiple re-transmission attempts. In some implementations, the route change wait time interval, the predetermined buffer time interval, and/or the size of the re-ordering buffer may be dynamically (or statically) configured based, at least in part, on the round-trip delay, the largest delay between receiving a last packet in sequence and receiving an out-of-order packet, re-transmission delay, expected delays in the hybrid communication network, and the maximum amount of data that might be accumulated waiting for a re-transmission.

Lastly, it is noted that the destination hybrid device 110 may not provide the route change indicators to the upper protocol layers. For example, the destination hybrid device 110 may discard the route termination packet and the route start packet and may only provide other control/data packets to the upper protocol layers for subsequent processing. As another example, the destination hybrid device 110 may remove any information (e.g., the route termination tag, the route start tag, etc.) inserted by the source hybrid device 102 to explicitly indicate a change in packet route from received packets, before providing the received packets for processing by the upper protocol layers.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
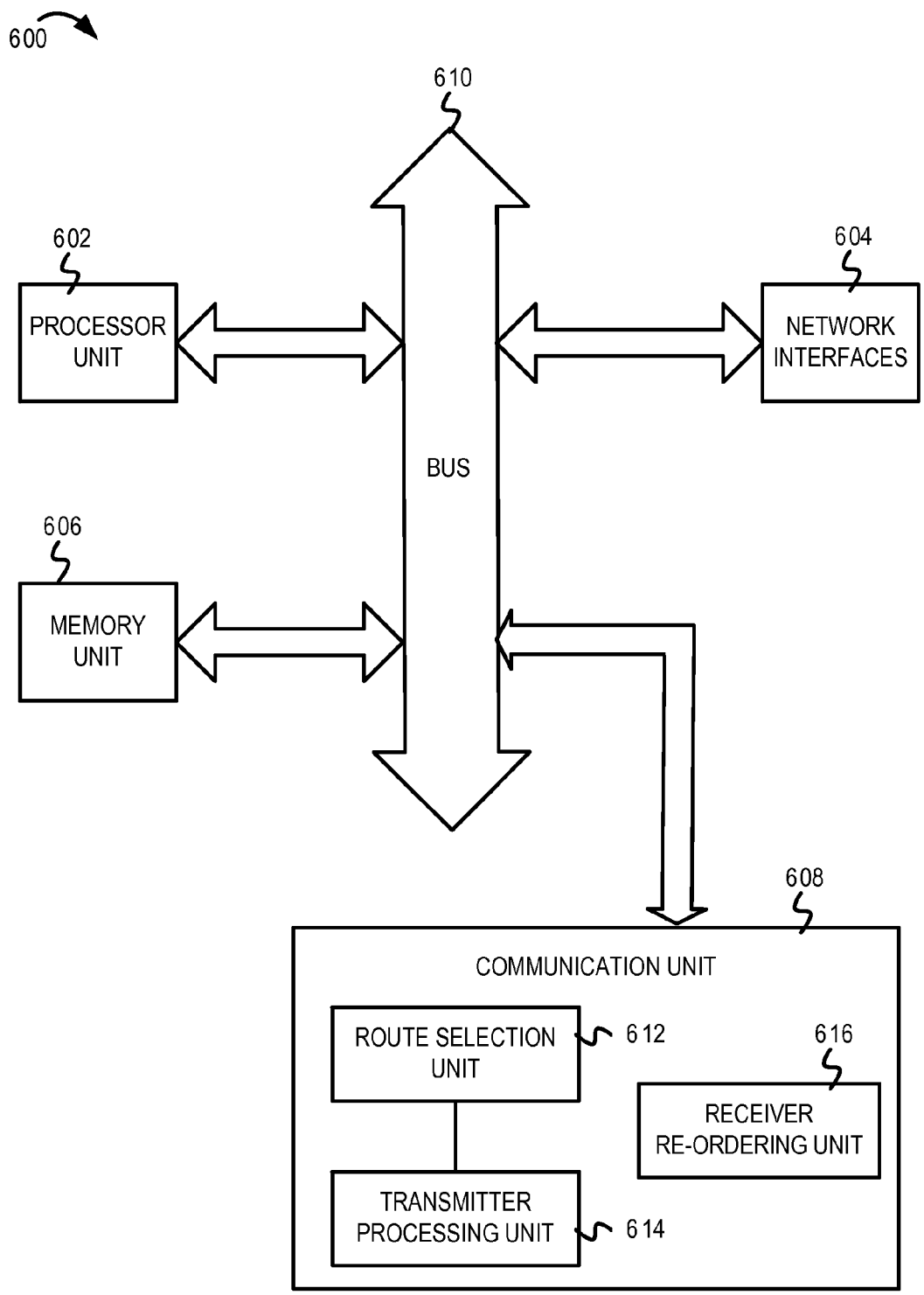
FIG. 6 is a block diagram of one embodiment of an electronic device including a mechanism for indicating packet route changes in a hybrid communication network.

FIG. 6 is a block diagram of one embodiment of an electronic device 600 including a mechanism for indicating packet route changes in a hybrid communication network. In some implementations, the electronic device 600 may be one of a desktop computer, laptop computer, a tablet computer, a mobile phone, a smart appliance, a powerline communication device, a gaming console, network bridging devices, or other electronic systems comprising a hybrid communication unit configured to communicate across multiple communication networks. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, Infini-Band®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.). In some implementations, the electronic device 600 can comprise a plurality of network interfaces—each of which couples the electronic device 600 to a different communication network. For example, the electronic device 600 can comprise a powerline communication interface, an Ethernet interface, and a WLAN interface that couple the electronic device 600 with a powerline communication network segment, Ethernet, and a wireless local area network respectively.

The electronic device 600 also includes a communication unit 608. The communication unit 608 comprises a route selection unit 612, a transmitter processing unit 614, and a receiver re-ordering unit 616. In some instances, the electronic device 600 can operate as a source device that transmits one or more packets to a destination device. In these instances, the route selection unit 612 and the transmitter processing unit 614 can implement functionality to identify a new packet route for transmitting one or more packets of a common packet stream, a set of packet streams, or a set of packets configured to share a common route, and provide one or more (implicit and/or explicit) indications of the change in the packet route, as described above in FIGS. 1-4. In other instances, the electronic device 600 can operate as a destination device that receives one or more packets from a source device. In these instances, the receiver re-ordering unit 616 can implement functionality to detect a change in the packet route (based on implicit or explicit route change indicators), re-order the received packets (if necessary), and provide the packets for subsequent processing, as described above in FIGS. 1 and 5. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, techniques for packet ordering on delivery route changes as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for managing packet routing in a communication network, the method comprising:
   detecting, at a first network device, a change in a packet route from a first packet route to a second packet route between the first network device and a second network device, wherein said detecting the change in the packet route comprises:
      detecting a route termination indicator within a route termination packet that is received at a first network interface via the first packet route, wherein the route termination indicator indicates the change in the packet route; and
      detecting a route start indicator within a route start packet that is received at a second network interface via the second packet route, wherein the route start indicator indicates that subsequent packets from the second network device will be transmitted via the second packet route;
   in response to said detecting the change in the packet route, determining whether a first packet received via the first packet route and a second packet received via the second packet route were received in a predetermined packet order based, at least in part, on whether the route start indicator was received prior to receiving the route termination indicator; and
   re-ordering the first packet and the second packet according to the predetermined packet order in response to determining that the first packet and the second packet were not received in the predetermined packet order.

2. The method of claim 1, wherein said re-ordering the first packet and the second packet further comprises storing, in a re-ordering buffer of the first network device, the second packet that is received after receiving the route start indicator and prior to receiving the route termination indicator.

3. The method of claim 1, wherein said detecting the change in the packet route comprises determining that the first packet received via the first packet route is associated with a first packet header that is different from a second packet header associated with the second packet received via the second packet route.

4. The method of claim 3, wherein said determining whether the first packet and the second packet were received in the predetermined packet order comprises:
   receiving a third packet that is associated with the first packet header, wherein the third packet is received after the second packet;
   determining that the third packet is received on the first packet route after the second packet is received on the second packet route based, at least in part, on the second packet header of the second packet and the first packet header of the third packet; and
   determining that the third packet is not received in the predetermined packet order based, at least in part, on determining that the third packet is received on the first packet route after the second packet is received on the second packet route.

5. The method of claim 1, further comprising analyzing a packet header associated with the first packet and a packet header associated with the second packet to detect the change in the packet route based, at least in part, on analyzing at least one member of a group consisting of a communication interface of the second network device, a lower protocol layer address of the second network device, a communication interface of the first network device, a lower protocol layer address of the first network device, a communication protocol implemented by the second network device, information associated with a forwarding network device, a number of bits in the packet header, a packet header format, and a packet header encoding.

6. The method of claim 1, further comprising classifying the first packet and the second packet as being associated with the first packet route or the second packet route based, at least in part, on the change in the packet route.

7. The method of claim 1, wherein said determining that the first packet and the second packet were received in the predetermined packet order comprises at least one member of a group consisting of:
   determining that the first packet and the second packet are part of a same packet stream; and
   determining that the first packet and the second packet are related packets that are part of different packet streams.

8. A first network device comprising:
   a network interface; and
   a re-ordering unit coupled with the network interface, the re-ordering unit operable to:

detect a change in a packet route from a first packet route to a second packet route between the first network device and a second network device, wherein the re-ordering unit operable to detect the change in the packet route comprises the re-ordering unit operable to detect:

a route termination indicator within a route termination packet that is received at a first network interface via the first packet route, wherein the route termination indicator indicates the change in the packet route; and a route start indicator within a route start packet that is received at a second network interface via the second packet route, wherein the route start indicator indicates that subsequent packets from the second network device will be transmitted via the second packet route;

in response to said detecting the change in the packet route, determine whether a first packet received via the first packet route and a second packet received via the second packet route were received in a predetermined packet order based, at least in part, on whether the route start indicator was received prior to receiving the route termination indicator; and re-order the first packet and the second packet according to the predetermined packet order in response to determining that the first packet and the second packet were not received in the predetermined packet order.

9. The first network device of claim 8, wherein the re-ordering unit is further operable to store, in a re-ordering buffer, at least the second packet that is received after receiving the route start indicator and prior to receiving the route termination indicator.

10. The first network device of claim 8, wherein the re-ordering unit is further operable to determine that the first packet is associated with a first packet header that is different from a second packet header associated with the second packet.

11. The first network device of claim 10, wherein the re-ordering unit is further operable to:

receive a third packet that is associated with the first packet header, wherein the third packet is received after the second packet;

determine that the third packet is received on the first packet route after the second packet is received on the second packet route based, at least in part, on the second packet header of the second packet and the first packet header of the third packet; and determine that the third packet is not received in the predetermined packet order based, at least in part, on determining that the third packet is received on the first packet route after the second packet is received on the second packet route.

12. The first network device of claim 8, wherein the re-ordering unit is further operable to classify the first packet and the second packet as being associated with the first packet route or the second packet route based, at least in part, on one of the route termination indicator or the route start indicator.

13. The first network device of claim 8, wherein the re-ordering unit is further operable to:

determine that the first packet and the second packet are part of a same packet stream; or determine that the first packet and the second packet are related packets that are part of different packet streams.

14. The first network device of claim 8, wherein the re-ordering unit is further operable to:

store at least the second packet in a re-ordering buffer of the first network device in response to determining that the first packet and the second packet were not received in the predetermined packet order; and provide the second packet from the re-ordering buffer for processing at an upper protocol layer of the first network device to re-order the first packet and the second packet.

15. A non-transitory machine-readable medium having instructions stored therein, which when executed by a processor causes the processor to perform operations that comprise:

detecting, at a first network device, a change in a packet route from a first packet route to a second packet route between the first network device and a second network device, wherein said detecting the change in the packet route comprises:

detecting a route termination indicator within a route termination packet that is received at a first network interface via the first packet route, wherein the route termination indicator indicates the change in the packet route; and detecting a route start indicator within a route start packet that is received at a second network interface via the second packet route; wherein the route start indicator indicates that subsequent packets from the second network device will be transmitted via the second packet route;

in response to said detecting the change in the packet route, determining whether a first packet received via the first packet route and a second packet received via the second packet route were received in a predetermined packet order based, at least in part, on whether the route start indicator was received prior to receiving the route termination indicator; and re-ordering the first packet and the second packet according to the predetermined packet order in response to determining that the first packet and the second packet were not received in the predetermined packet order.

16. The non-transitory machine-readable medium of claim 15, wherein said detecting a change in the packet route comprises determining that the first packet is associated with a first packet header that is different from a second packet header associated with the second packet.

17. The non-transitory machine-readable medium of claim 16, wherein said operation of determining whether the first packet and the second packet were received in the predetermined packet order comprises:

receiving a third packet that is associated with the first packet header, wherein the third packet is received after the second packet;

determining that the third packet is received on the first packet route after the second packet is received on the second packet route based, at least in part, on the second packet header of the second packet and the first packet header of the third packet; and determining that the third packet is not received in the predetermined packet order based, at least in part, on determining that the third packet is received on the first packet route after the second packet is received on the second packet route.

18. The non-transitory machine-readable medium of claim 15, wherein:

in response to determining that the first packet and the second packet were not received in the predetermined packet order, the operations further comprise:

storing at least the second packet in a re-ordering buffer of the first network device; and
said operation of re-ordering the first packet and the second packet according to the predetermined packet order comprises:
providing the second packet from the re-ordering buffer for processing at upper protocol layer of the first network device.

\* \* \* \* \*